Patented June 25, 1929.

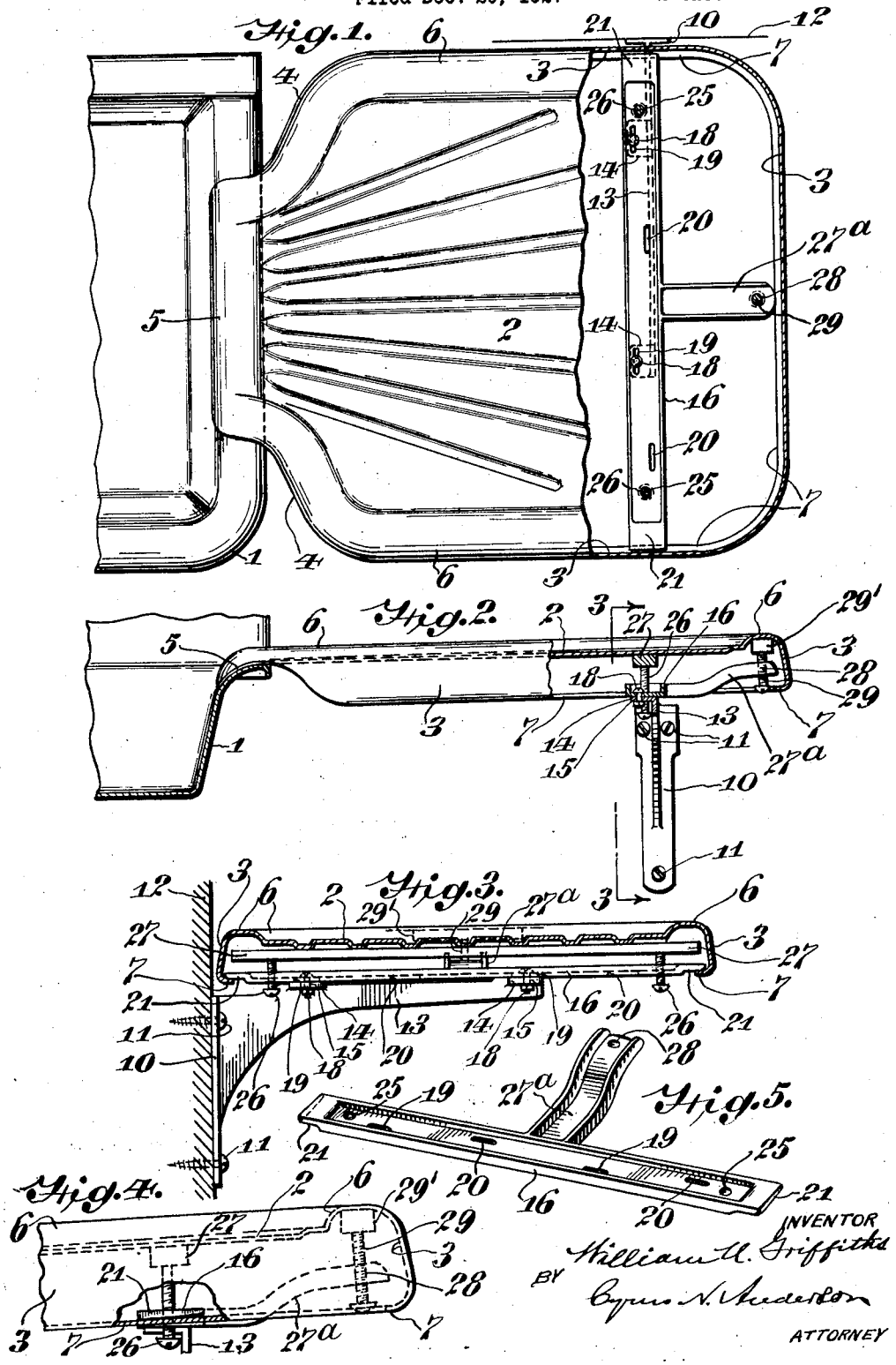

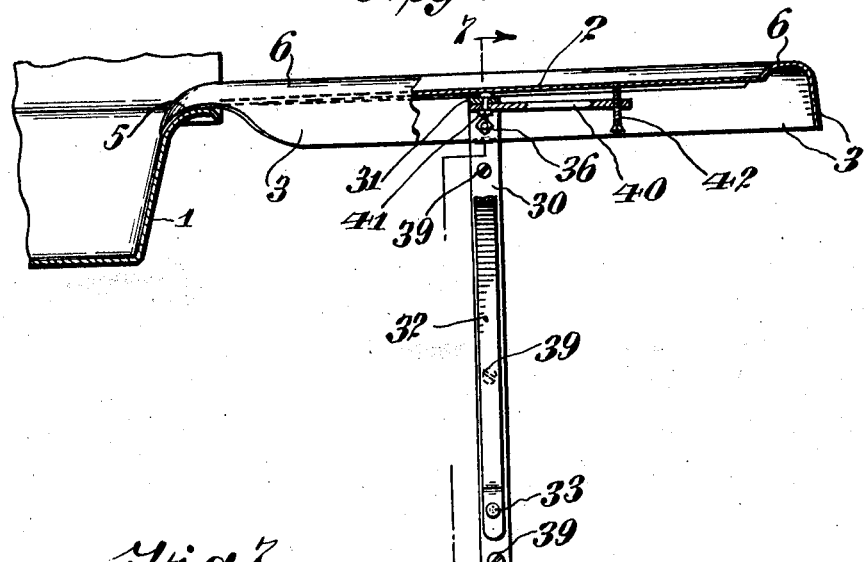
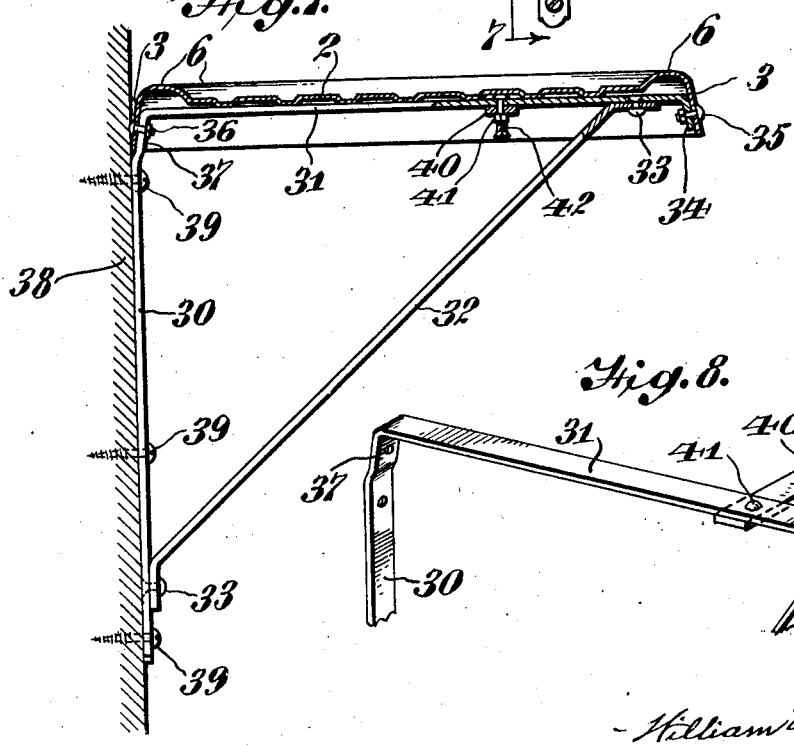
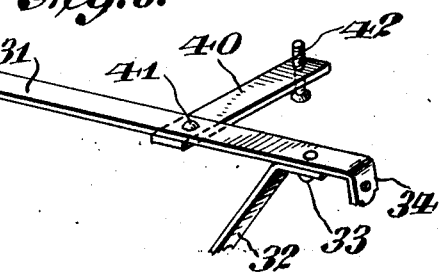

1,718,231

UNITED STATES PATENT OFFICE.

WILLIAM U. GRIFFITHS, OF PHILADELPHIA, PENNSYLVANIA.

DRAIN BOARD.

Application filed December 20, 1927. Serial No. 241,288.

My invention relates to drain - boards which are adapted for use in connection with kitchen sinks and the like for the purpose of draining water from dishes and kitchen utensils into a sink with which the said board may be associated.

The general object of the invention is to provide a drain-board of sheet metal and to combine therewith suitable means by which it may be supported in operative relation to a kitchen sink or the like.

Other objects and advantages of the invention will be pointed out in the detailed description thereof which follows, or will become apparent from such description.

In order that the invention may be readily understood and its practical advantages fully appreciated, reference should be had to the accompanying drawings, in which I have illustrated certain forms of mechanical embodiment thereof. However, it will be understood that the invention is susceptible of embodiment in other forms of construction than those shown, and that changes in the details of construction may be made within the scope of the claims without departing from the said invention or the principle thereof.

In the drawings;

Fig. 1 is a view partly in top plan and partly in horizontal section;

Fig. 2 is a view partly in edge elevation and partly in vertical section;

Fig. 3 is a transverse sectional view taken on the line 3—3 of Fig. 2;

Fig. 4 is a view in side elevation of the outer end portion of the outer edge of the drain-board embodying the invention, a portion of the edge being broken away in order to show more clearly a certain detail of construction;

Fig. 5 is a view in perspective of one of the elements employed in the supporting of the drain-board;

Fig. 6 is a view similar to that shown in Fig. 2 but showing a modified construction of the drain-board embodying the invention;

Fig. 7 is a view taken on the line 7—7 of Fig. 6; and

Fig. 8 is a view in perspective of a portion of the means shown in Figs. 6 and 7 for supporting the drain-board in operative relation to a kitchen sink or the like.

In the drawings I have shown a kitchen sink 1 of any know construction, and a drain-board 2 which is formed preferably of sheet metal pressed or otherwise formed into the shape desired.

In the pressing of the same flanged portions 3 are formed which project downwardly from the opposite sides and the outer end portion thereof. The opposite side edges of the board are curved and tapered inwardly at 4 so that the said board terminates in an inwardly and downwardly extending tongue-like portion 5. The under side of the board adjacent the margin thereof at the sides and end is pressed upwardly so as to form a marginal upwardly extending ridge 6, which operates to prevent the water which may drain from dishes and kitchen utensils which may have been washed and placed upon the board, from running over the sides and outer end thereof and dripping onto the floor. These marginal ridges 6 terminate at the inner end of the board on opposite sides of the inwardly and downwardly extending tongue-like portion 5.

It will be apparent that what I have termed the inner tongue-like end portion of the board is supported upon the upper edge of one end of the sink 1.

In the several forms of construction I have provided brackets which cooperate with the sink 1 in supporting the drain-board.

In Figs. 1 to 5, inclusive, of the drawings I have shown a construction in which the lower edges of the flanges 3 are turned inwardly, as indicated at 7. The presence of these inwardly extending flanges 7 upon the lower edges of the flanges 3 serves to stiffen and strengthen the latter. The said flanges also cooperate with the main or intermediate body portion of the board to secure the said board to the bracket structure which will now be described. The bracket comprises a vertical portion 10, which is secured by means of screws 11 to the side of an upright wall or other support 12. The horizontally and outwardly extending portion 13 of the bracket is provided with ears 14 which project laterally from one side of the upper edge. These ears are provided with openings 15 therethrough, as shown. A bar 16 is mounted upon the upper edge of the horizontally extending edge 13 of the bracket and is secured thereto by means of bolts and nuts 18 which are adapted to extend either through elongated slots 19 or elongated slots 20 in the bar 16. The purpose of providing two pairs of slots, 19 and 20, is to enable the use of the same bar whether one end or the other thereof be located in adjoining relation to the inner end of the horizontal portion 13 of the supporting bracket. The changing of ends in the manner suggested will occur in case the position of the board with respect to the sink should be changed, so that its inner end would be supported upon the upper edge of the opposite end of said sink. The holes 19 are elongated in order that the bar may be adjusted lengthwise to position it in proper relation to the horizontal arm 13 of the bracket and the flanges 7 and the lower edges of the flanges 3 at the opposite sides of the drain-board, with which flanges 7 the opposite ends of said bar are adapted to be engaged.

Preferably the bar is of channel shape, as shown, and provided at its opposite ends with flattened, relatively thin portions, as indicated at 21. These portions rest upon the flanges 7 at the lower edges of the flanges 3 at the opposite sides of the board. For the purpose of fastening the board to the horizontal arm 13 of the bracket I have provided the bar 16 with tapped openings 25 adjoining its opposite ends, with which adjustable screws 26 are in engagement. The upper ends of these screws are adapted to contact wtih a bar 27 extending transversely of the drain-board and being located between the under side of the intermediate main body portion thereof and the upper ends of said screws. Upon adjusting the said screws upwardly, with their upper ends in contact with the under side of said bar, the latter is clamped against the under side of the board and the reaction between the bar and board and screws 26 operates to cause the flanges 7 in engagement with the under sides of the opposite ends of the bar 16 to press upwardly against said ends. It will be apparent that by this means the board is detachably connected with the horizontal portion 13 of the bracket. It also will be apparent that by reason of the interposition of the bar 27, which is of wood, the contact of the screws 26 directly with the metal of the board is prevented. As a result of the presence of the wood injury to the board is less likely to be effected than would be the case if the end of the screw 26 bore directly upon the said board.

For the purpose of preventing tilting of the outer end of the board, that is, the end furthest away from the sink 1, I have provided the bar 16 with a projection or arm 27$^a$ which extends laterally therefrom and which is provided at its outer end with a tapped opening 28, with which an adjustable screw 29 is in engagement. The inner end of the said screw is adapted to contact with a block of wood 29' interposed between the same and the opposing adjoining portion of the under side of the board. By tightening the screw 29 it is pressed and clamped against the block of wood 29' and the latter is thereby pressed and clamped against the adjoining under side of the board. It will be seen that the action which results from the tightening of the screw 29 is to press the outer end portion of the board upwardly, tending to cause rotation or movement thereof about the horizontal arm 13 of the bracket. The inner end of the board is thereby held in close contact with the upper conforming edge of the sink 1.

Referring now to Figs. 6, 7 and 8 of the drawings, 30 and 31 designate the vertical and horizontal leg portions of a metal bracket, and 32 a brace bar extending diagonally of the said leg portions and connected to the same adjacent their outer ends by rivets 33. The top horizontally extending leg 31 is provided at its outer end with a downwardly bent portion 34, which is secured by means of a bolt and nut 35 to the outer or front side flange 3 of the drain-board 2. The opposite or rear side of the board is connected by a bolt and nut 36 to the offset portion 37 of the upper end of the vertical leg 30 of the bracket. The vertical leg 30 is secured to an adjoining wall or other support 38 by means of screws 39.

A bar 40 is secured at its inner end by means of a bolt and nut 41 to the top leg of the bracket. The said bar extends underneath the drain-board 2 toward the outer end of the latter and is provided adjacent its outer end with an adjustable screw 42, the upper end of which is adapted to contact with the under side of the board 2. If preferred, a thin block of non-metallic material may be interposed between the upper end of said screw and the adjoining portion of the said board in order to prevent direct contact of the screw with the board. By adjusting the screw 42 the force of the pressure of its inner end against the board may be varied so as to vary the force with which the inner tongue-like end portion 5 of the board is caused to press against the upper conforming edge of the sink 1.

It will be seen that by my invention I have provided a construction of drain-board of relatively thin sheet metal, preferably formed by pressing, which is of practical and desirable character; also that I have provided new and novel means by which the said board may be mounted in cooperative relation to a kitchen sink or the like.

In the construction as illustrated in Figs. 1 to 5, inclusive, of the drawing I have shown supporting means of a character such that it may be used without regard to the end of the sink with which it may be associated. In other words, whether the board be inclined toward the right or to the left of a person standing in facing relation to a sink, the same means for supporting the bracket in cooperative relation with respect to a sink may be employed.

This application discloses in part subject-matter which is disclosed in my application filed March 3rd, 1924, Serial No. 696,719, and with respect to such subject-matter is a continuation of the said earlier application.

Having thus described my invention, what I claim and desire to secure by Letters Patent is:

1. In a drain-board structure, in combination, a drain-board having depending flanges at its opposite sides, a cross bar extending between said flanges and secured at its opposite ends thereto, a bracket secured to said cross bar for supporting the said board, and an arm extending outwardly from said cross-bar and having means at its outer end contacting with the under side of the outer end portion of the said board.

2. In a drain-board structure, in combination, a drain-board having depending flanges at its opposite sides, a bracket for supporting the said board, the vertical leg portion of the said bracket being secured to a wall and the opposite ends of the horizontal leg portion thereof having operative connection with the said flanges, an arm having operative connection with the said horizontal leg portion of the bracket and extending toward the outer end of said drain board, and means at the outer end of said arm for supporting the outer end of the said board.

3. In a drain-board structure, in combination, a drain-board having depending flanges at its opposite side edges, a bracket having vertical and horizontal leg portions, means for securing the vertical leg portion to a vertical support, means for operatively securing the horizontal leg portion of said bracket to the said flanges, an arm having operative connection with the said horizontal leg portion and extending therefrom toward the outer end of the said board, said arm being located underneath said board, and adjustable means at the outer end of said arm adapted to exert pressure against the adjoining portion of the said board to force the same upwardly.

4. In a drain-board structure, in combination, a sheet metal board having depending flanges at its opposite sides which terminate at their lower edges in inwardly extending flanges, a bracket having vertical and horizontal leg portions for supporting the said board, a bar adjustably secured to the upper side of the horizontal leg portion of said bracket, the opposite ends of said bar resting upon the upper sides of the said inwardly turned flanges, and adjustable means secured to the opposite ends of said bar for exerting upward pressure against said board to clamp the said inwardly turned flanges against the opposite ends of said bar.

5. In a drain-board structure, in combination, a sheet metal drain-board having depending flanges at its opposite side edges, which flanges terminate at their lower edges in inwardly turned portions, a bracket having a horizontal portion to which the said board is adapted to be detachably secured and thereby supported, a bar secured to the upper side of the said horizontal leg portion of the bracket, said bar being adjustable lengthwise, and the opposite ends of said bar being in contact with the upper sides of the said inwardly turned portions at the lower edges of the said depending flanges, adjustable means secured to the said bar, which means project upwardly from said bar toward the said board, a bar of suitable material interposed between the said adjustable means and the adjoining portion of the said board which bar is adapted to be clamped against the said board by the adjustment of the said adjustable means and the said bar being provided with a laterally projecting arm the outer end of which terminates in adjoining relation to the outer end of said board and underneath the same, and adjustable means carried by the said arm and adapted to exert upward pressure against the adjoining under side portion of the said board.

6. In a drain-board structure, in combination, a drain-board of pressed sheet metal, having depending flanges at its opposite sides which flanges terminate at their lower edges in inwardly extended portions, a bracket for supporting said board, said bracket having a horizontal leg portion to which the said board is secured, a bar having a couple of pairs of spaced elongated openings therein, means for engaging the openings of either pair of openings for securing the said bar to the horizontal leg of the said bracket, the opposite ends of said bar being in engagement with the upper sides of the inturned portions of the lower edges of said depending flanges, adjustable screws in engagement with the said bar in adjoining relation to the outer ends thereof, a non-metallic bar interposed between the upper ends of said screws and the adjoining portion of the said board which bar is adapted to be clamped against the said board by the pressure of the said screws thereagainst, such pressure being adapted to clamp and press the said inturned portions against the under sides of the opposite ends of the said bar, and the said bar being provided with an outwardly extending arm which has adjustable means thereon for exerting upward pressure against the adjoining portion of the board.

In testimony that I claim the foregoing as my invention, I have hereunto signed my name this 19th day of December, A. D. 1927.

WILLIAM U. GRIFFITHS.